United States Patent
Soffer

(10) Patent No.: US 8,942,218 B2
(45) Date of Patent: Jan. 27, 2015

(54) RETRANSMISSION OF DATA USING SUB-CARRIER FREQUENCY PERMUTATION

(75) Inventor: Menashe Soffer, Katzir (IL)

(73) Assignee: Intel Corporation, Santa Clara, CA (US)

( * ) Notice: Subject to any disclaimer, the term of this patent is extended or adjusted under 35 U.S.C. 154(b) by 889 days.

(21) Appl. No.: 11/540,188

(22) Filed: Sep. 29, 2006

(65) Prior Publication Data

US 2008/0079574 A1    Apr. 3, 2008

(51) Int. Cl.
| | |
|---|---|
| *H04B 7/208* | (2006.01) |
| *G01R 31/08* | (2006.01) |
| *H04L 1/18* | (2006.01) |
| *H04W 28/04* | (2009.01) |

(52) U.S. Cl.
CPC ............. *H04L 1/1893* (2013.01); *H04W 28/04* (2013.01)
USPC ............................ 370/344; 370/236; 455/450

(58) Field of Classification Search
USPC .......................................................... 370/344
See application file for complete search history.

(56) References Cited

U.S. PATENT DOCUMENTS

| | | | | |
|---|---|---|---|---|
| 7,190,689 | B2* | 3/2007 | Sato et al. | 370/344 |
| 7,542,409 | B2* | 6/2009 | Kim | 370/206 |
| 7,573,805 | B2* | 8/2009 | Zhuang et al. | 370/208 |
| 8,181,076 | B2* | 5/2012 | Lou et al. | 714/748 |
| 2003/0067890 | A1* | 4/2003 | Goel et al. | 370/310.1 |
| 2003/0123559 | A1* | 7/2003 | Classon et al. | 375/260 |
| 2004/0114566 | A1* | 6/2004 | Lim et al. | 370/349 |
| 2004/0146123 | A1* | 7/2004 | Lai | 375/329 |
| 2005/0207345 | A1* | 9/2005 | Onggosanusi et al. | 370/236 |
| 2005/0255805 | A1* | 11/2005 | Hottinen | 455/8 |

OTHER PUBLICATIONS

English Machine Translation of JP2004369683 [online] Jun. 7, 2006 www4.ipdl.inpit.go.jp/Tokujitu/PAJdetail.ipdl.*

* cited by examiner

*Primary Examiner* — Vladimir Magloire
*Assistant Examiner* — Natasha Cosme
(74) *Attorney, Agent, or Firm* — Forefront IP Lawgroup, PLLC

(57) ABSTRACT

Embodiments of retransmission of data using sub-carrier frequency permutation are described herein.

15 Claims, 4 Drawing Sheets

US 8,942,218 B2

RETRANSMISSION OF DATA USING SUB-CARRIER FREQUENCY PERMUTATION

BACKGROUND

The prevalence of wireless communication continues to expand as users desire the convenience of wireless communication in an every expanding variety of devices, including traditional wireless devices such as phones to desktop computers, peripheral devices, gaming equipment, digital cameras, and so on. As this prevalence continues to expand, so to does the desire of users to increase the functionality of the wireless communication available to support the functionality desired in the devices.

One of the many considerations that may affect the functionality available to wireless devices is the effect of the wireless medium on communications attempted between the devices. For example, interference may cause a transmission between wireless devices to become corrupted. To address this, techniques have been developed to cause re-transmission of the data that was corrupted such that an intended recipient may receive each packet of data, and each symbol in the packet, to support the desired functionality. However, the wireless medium may affect different portions of the transmitted data differently, and therefore data retransmitted using traditional techniques may still encounter the same interference and consequently become corrupted in the same way, thereby limiting and even negating the purpose of the retransmission.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
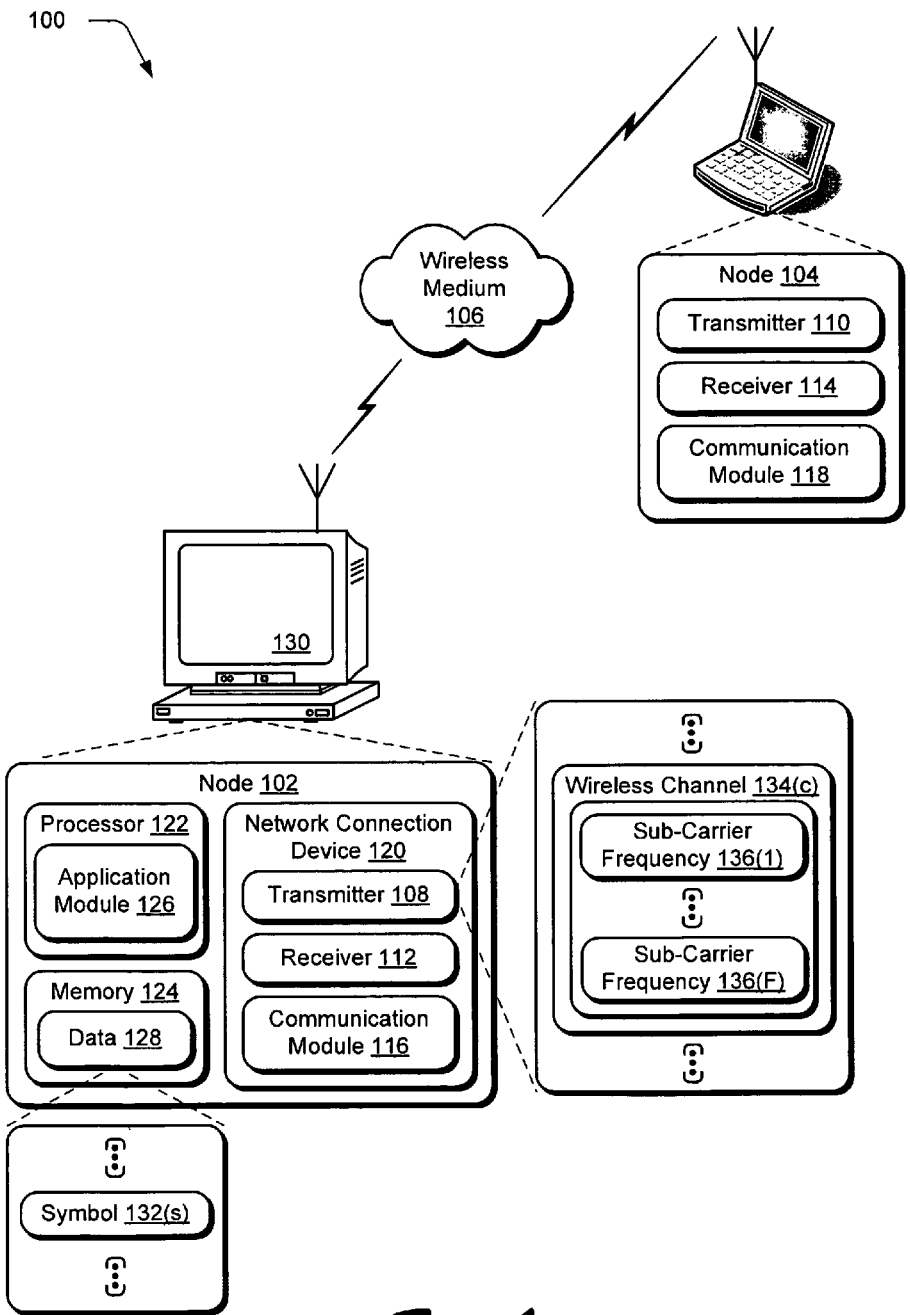
FIG. 1 is an illustration of an environment in an exemplary implementation that is operable to employ sub-carrier frequency permutation techniques to retransmit data.

In the following discussion, an exemplary environment is first described that is operable to perform techniques to retransmit data using sub-carrier frequency permutation. Exemplary procedures are then described that may be employed in the exemplary environment, as well as in other environments.

Exemplary Environment

The illustrated environment 100 includes a plurality of nodes 102, 104 that are communicatively coupled, one to another, via a wireless medium 106, such as a medium that employs Orthogonal Frequency Division Modulation (OFDM). The nodes 102, 104 may be configured in a variety of ways for network access. For example, one or more of the nodes 102, 104 may be configured as a computing device, such as a desktop computer as illustrated by node 102, a laptop computer as illustrated by node 104, a mobile station, an entertainment appliance, a wireless phone, and so forth. The nodes may also be configured as a wireless access point, such as to access the Internet. The nodes 102, 104, in portions of the following discussion, may also relate to a person and/or entity that operate the clients. In other words, one or more of the nodes 102, 104 may describe logical nodes that include users, software, and/or devices.

For example, the nodes 102, 104 may include respective transmitters 108, 110, receivers 112, 114 and communication modules 116, 118 to provide network functionality, which may be accomplished in a variety of ways. The transmitter 108 of node 102, for instance, is illustrated as being provided by a network connection device 120. As previously described, node 102 is illustrated as a desktop computer, which includes a processor 122 and memory 124 (e.g., dynamic random access memory, cache memory, non-volatile memory, volatile memory, and so on). Further, an application module 126 is depicted as being executed on the processor 122, which is also storable in memory 124. The application module 126 may be configured in a variety of ways, such as a browser to communicate over the wireless medium 106 through interaction with the network connection device 120 and display data 128 pertaining to that interaction on a display device 130. Further, this data 128 may be provided to the network connection device 120 for transmittal over the wireless medium 106 to the node 104. A variety of other examples are also contemplated.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 124 is shown, a wide variety of types and combinations of memory may be employed, such as random access memory (RAM), hard disk memory, removable medium memory, and other types of computer-readable media.

The communication modules 116, 118 are representative of functionality that may be employed to manage wireless communication performed by the respective nodes 102, 104. For example, the communication module 116 may receive data 128 from the application module 126 to be transmitted over the wireless medium 106 to node 104. The data 128 may include one or more symbols 132(s) (where "s" can be any integer from one to "S" and thus in the following discussion may be referenced in single or plural form), which may include text, binary data, and so on. The communication modules 116, 118, may incorporate a variety of components to provide this functionality, such as a scrambler, encoder (which may be used to add redundancy), interleaver (e.g., to perform a permutation which is described in greater detail below), and so on.

To transmit the data 128, the communication module 116 may cause the transmitter 108 to form one or more wireless channels 134(c) (where "c" can be any integer from one to "C") to communicate with the node 104. Each of the wireless channels 134(c), for instance, may define a "slice" of a frequency spectrum that is operable to communicate the data 128. Further, the wireless channel 134(c) may have a plurality of sub-carrier frequencies 136(1)-136(F) that are supported by the transmitter 108 and receiver 112 to transmit and receive the plurality of symbols 132(s). Therefore, the communication module 116 may cause the transmitter 108 to transmit the symbols 132(s) of the data 128 using the plurality of sub-carrier frequencies 136(1)-136(F) to be received by the receiver 114 of the node 104 over the wireless medium 106.

As previously described, however, the wireless medium 106 in some instances may interfere with transmission of the symbols 132(s). Therefore, the node 102 may retransmit the symbols 132(s) to the node 104, such as when an acknowledgement has not been received from the node 104 (e.g., "timing out"), in response to a re-transmittal request received from the node 104, and so on. However, the wireless medium 106 may affect different sub-carrier frequencies 136(1)-136(F) differently. To address this, the communication module 116 may be configured to permutate the symbols 132(s) across the sub-carrier frequencies 136(1)-136(F) such that a sub-carrier frequency that was used to initially transmit a symbol 132(s) is not used to retransmit the symbol 132(s). In this way, the likelihood is increased of receiving a symbol 132(s) that was adversely affected because of transmittal over a particular sub-carrier frequency during an initial transmission. Further discussion of sub-carrier frequency permutation may be found in relation to the following figures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., central processing unit). The program code can be stored in one or more computer readable memory devices, e.g., memory 124. The features of the techniques described below are platform-independent, meaning that the techniques may be implemented on a variety of commercial computing platforms having a variety of processors.

Figure 2:
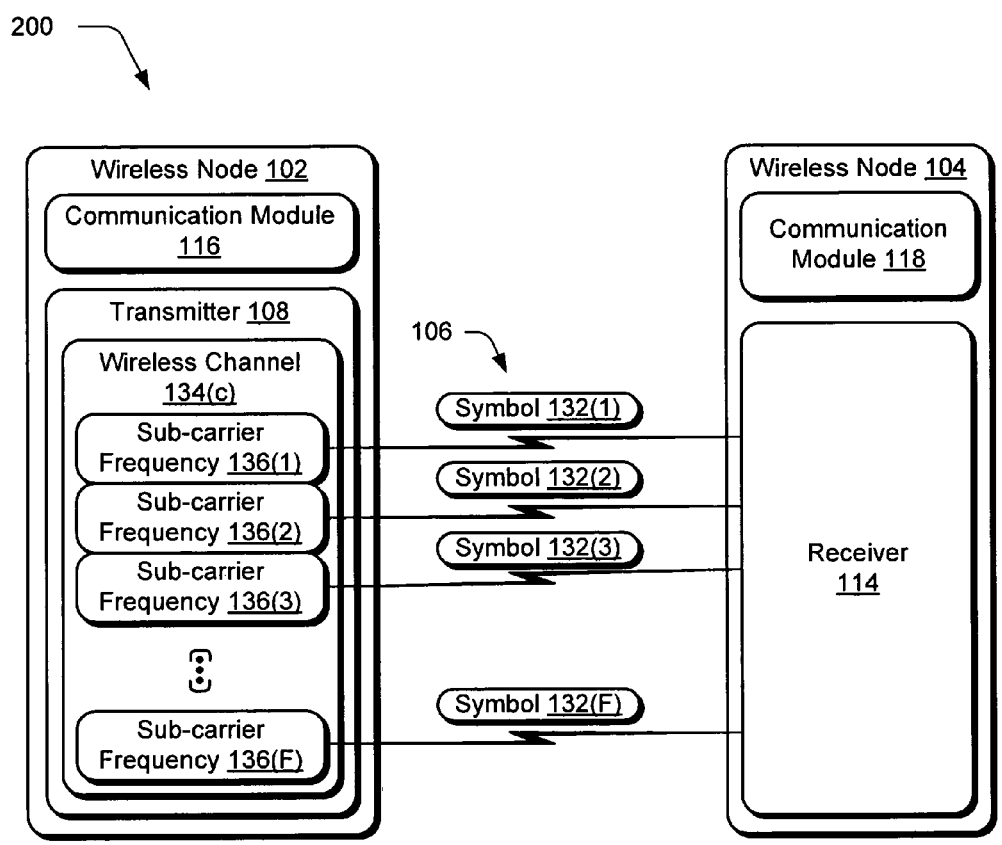
FIG. 2 is an illustration of an exemplary implementation in which a wireless node of FIG. 1 transmits symbols using a plurality of sub-carrier frequencies for receipt by another wireless node.

FIG. 2 is an illustration of an exemplary implementation 200 in which the wireless node 102 of FIG. 1 transmits symbols 132(1)-132(F) using a plurality of sub-carrier frequencies 136(1)-136(F) for receipt by the other wireless node 104. The transmitter 108 of FIG. 2 is illustrated as transmitting symbols 132(1), 132(2), 132(3) and 132(F) on respective sub-carrier frequencies 136(1), 136(2), 136(3) and 136(F) over a wireless medium 106.

In some instances, however, the wireless medium 106 (i.e., environment) may attenuate some of the sub-carrier frequencies more than others. In other words, the wireless medium may cause selective fading to particular sub-carrier frequencies. Accordingly, when a retransmission of the symbols 132(1)-132(F) is warranted (e.g., an acknowledgement has not been received from the wireless node 104 of success reception) the communication module 116 may permutate the symbols across the sub-carrier frequencies 136(1)-136(F), an example of which may be found in the following figure.

Figure 3:
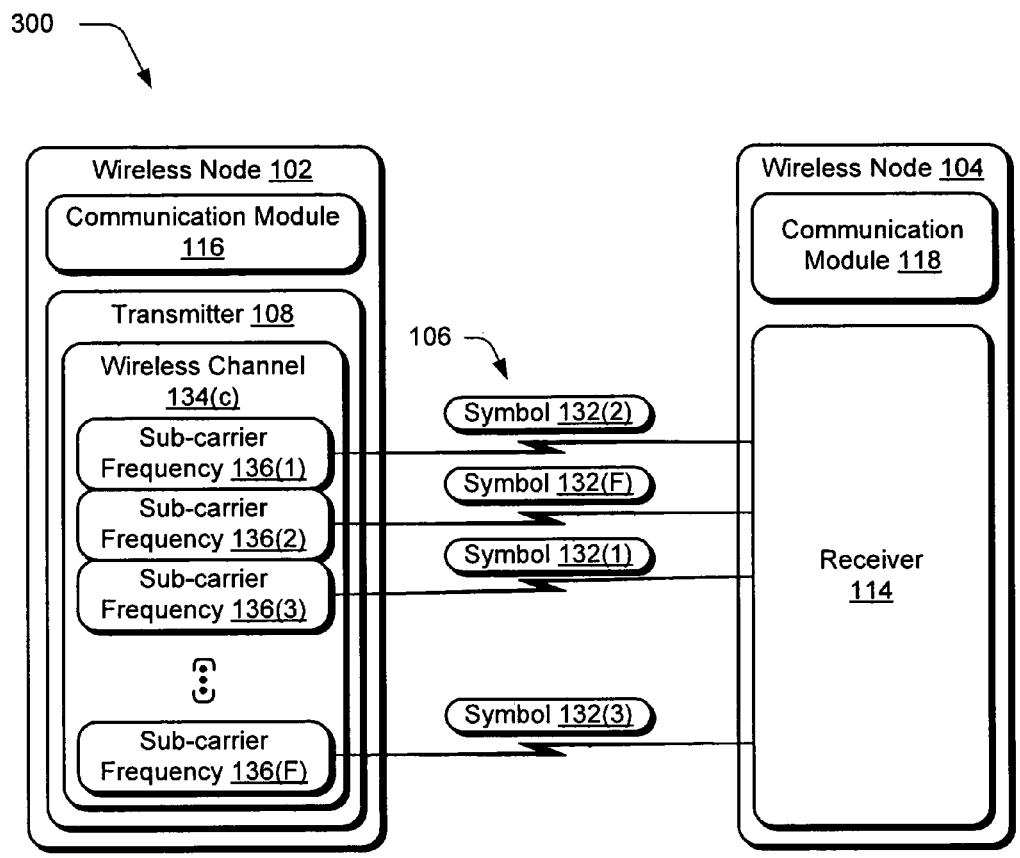
FIG. 3 is an illustration of an exemplary implementation in which the wireless node of FIG. 1 retransmits symbols using a permutation of the plurality of sub-carrier frequencies used in FIG. 2 for receipt by the other wireless node.

FIG. 3 is an illustration of an exemplary implementation 300 in which the wireless node 102 of FIG. 1 retransmits symbols 132(1)-132(F) using a permutation of the plurality of sub-carrier frequencies 136(1)-136(F) used in FIG. 2 for receipt by the other wireless node 104. In the retransmission 200, the communication module 116 permutates the symbols 132(1)-132(F) across the sub-carrier frequencies 136(1)-136(F) such that at least one different sub-carrier frequency is used to transmit a symbol in the retransmission 300 as opposed to the transmission 200.

As shown in FIG. 3, for instance, symbol 132(2) is transmitted by sub-carrier frequency 136(1), symbol 132(F) is transmitted by sub-carrier frequency 136(2), symbol 132(1) is transmitted by sub-carrier frequency 136(3) and symbol 132(3) is transmitted by sub-carrier frequency 136(F). Thus, in the illustrated example, each of the symbols 132(1)-132(F) is transmitted by a different respective sub-carrier frequency in the retransmission 300. It should be readily apparent, however, that a variety of other examples are also contemplated.

The wireless node 104 may the combine the original and retransmitted symbols 132(1)-132(F) to arrive at a combined packet that may then be demodulated by the communication module 118. For example, the communication module 118 may obtain an optimal weighted average of the symbols 132(1)-132(F) from the two packets, such as through a maximum ratio combining (MRC) technique. In this way, the selectivity of the effective combined channel with be decreased, which increases a likelihood of correct decoding. Further discussion of transmission and decoding may be found in relation to the following figures.

Exemplary Procedures

The following discussion describes sub-carrier frequency permutation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the transmission 200 of FIG. 2 and the retransmission 300 of FIG. 3.

Figure 4:
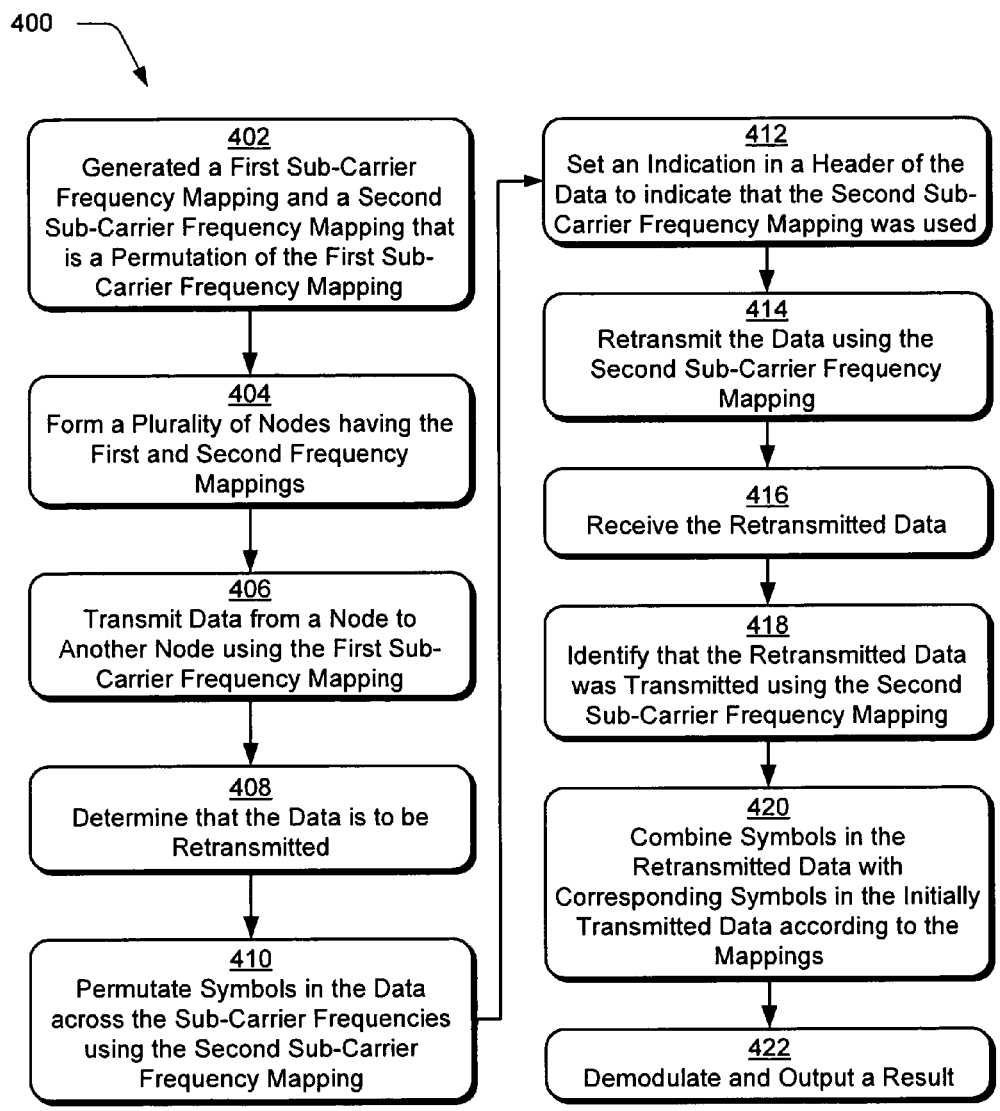
FIG. 4 is a flow diagram depicting a procedure in an exemplary implementation in which data is retransmitted using a permutation of sub-carrier frequencies used to initially transmit the data.

FIG. 4 depicts a procedure 400 in an exemplary implementation in which data is retransmitted using a permutation of sub-carrier frequencies used to initially transmit the data. First and second sub-carrier frequency mappings are generated, in which, the second sub-carrier frequency mapping is a permutation of the first sub-carrier frequency mapping (block 402). For example, a technician/engineer may perform a variety of simulations to determine which sub-carrier frequencies, if any, are typically attenuated in a contemplated setting, such as in an office, home, outdoor environment, and so on. The mappings may then be generated to take this attenuation into account to increase likelihood that symbols that were not successfully transmitted in a first instance will be successfully retransmitted. A variety of other examples are also contemplated, such as to address random attenuation in a variety of settings. A plurality of nodes may then be formed having the first and second frequency mappings (block 404). For example, the mappings may be incorporated within hardware, firmware and/or software of a network connection device, such as a router, network interface card, and so on.

Data is transmitted from a node to another node using the first sub-carrier frequency mapping (block 406). The first sub-carrier frequency mapping, for instance, may be a default mapping that is used by nodes to initially transmit and receive data. A determination may be made, however, that the data is to be retransmitted (block 408). For example, the transmitting node may determine that a predetermined amount of time has elapsed, in which, an acknowledgement has not been received. In another example, the node that was the intended recipient of the transmission may receive a portion of the transmission, and therefore send a request for a retransmission. A variety of other examples are also contemplated.

Symbols in the data are permutated across the sub-carrier frequencies using the second sub-carrier frequency mapping (block 410). For example, as shown in FIG. 3, the symbols may be assigned for transmission by different sub-carrier frequencies that were used to initially transmit the data in FIG. 2. An indication may also be set in the header of the data to indicate that the second sub-carrier frequency mapping was used (block 412). A bit, for instance, may be set in the header to act as a flag to indicate which mapping is used, which may therefore also indicate that the data is being retransmitted. The data is then retransmitted using the second sub-carrier frequency mapping (block 414).

The intended recipient (i.e., the other node) receives the retransmitted data (block 416). The intended recipient then identifies that the retransmitted data was transmitted using the second sub-carrier frequency mapping (block 418), such as by examining the indication in the header. Symbols in the retransmitted data are combined with corresponding symbols in the initially transmitted data according to the mappings (block 420). The combined symbols are then demodulated and a result of which is output (block 422), such as on a display device, to an application, and so on. For example, a modem the demodulated (and optionally combined) symbols may then be admitted to a de-mapper, de-interleaver, error correction decoder and de-scrambler to re-convert the symbols in bits for display. Thus, the symbols may be used as intermediate entities between two modems (the transmitter and receiver) used to communicate bits of application served by the modems. A variety of other examples are also contemplated. Although predetermined mappings have been described in this example, it should be readily apparent that permutations of symbols across sub-carrier frequencies may be performed in a variety of ways, such as dynamically through transmittal of mappings with the symbols themselves, and so on.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising:
   a transmitter to wirelessly transmit data having a plurality of symbols utilizing a first sub-carrier frequency mapping; and
   a hardware module to cause the transmitter to retransmit the data utilizing a second sub-carrier frequency mapping such that at least one said symbol in the data is retransmitted wirelessly over a sub-carrier frequency that is different from a sub-carrier frequency previously used to transmit the at least one symbol, wherein the second sub-carrier mapping is selected from a plurality of sub-carrier frequency mappings pre-generated to account for an environment the transmitter is located in, wherein the second sub-carrier is selected based upon an increased likelihood that symbols that were not successfully transmitted will be successfully retransmitted; and
   a communication module that demodulates a combined packet that includes original and retransmitted symbols in the combined packet, wherein the communication module obtains an optimal weighted average of the symbols of packets of the combined packet.

2. An apparatus as described in claim 1, wherein the transmitter is operable to wirelessly transmit the data using a single antenna.

3. An apparatus as described in claim 1, wherein the transmitter is operable to wirelessly transmit the data using Orthogonal Frequency Division Multiplexing (OFDM).

4. An apparatus as described in claim 1, wherein the hardware module is to cause re-transmittal of the data when an acknowledgement has not been received from an intended recipient of the data.

5. An apparatus as described in claim 1, wherein the hardware module is to include an indication in the header of the retransmitted data to indicate that the plurality of symbols in the data in the retransmission are permutated across sub-carrier frequencies with respect to the plurality of symbols in a previous transmission.

6. An apparatus as described in claim 1, wherein the hardware module is to retransmit the data in response to a request received from an intended recipient of the data.

7. An apparatus comprising:
   a receiver to receive a first transmission of data transmitted utilizing a first sub-carrier frequency mapping and a second transmission of the data transmitted using a second sub-carrier frequency mapping that is a permutation of the first sub-carrier frequency mapping, wherein symbols in the data in the second transmission are permutated across sub-carrier frequencies with respect to symbols in the first transmission, wherein the second sub-carrier mapping is selected from a plurality of sub-carrier frequency mappings pre-generated to account for an environment a transmitter that has transmitted the data is located in; and
   a communication module that demodulates a combined packet that includes original and retransmitted symbols in the combined packet, wherein the communication module obtains an optimal weighted average of the symbols of packets of the combined packet.

8. An apparatus as described in claim 7, wherein the receiver is to receive the first and second transmissions wirelessly via a single antenna.

9. An apparatus as described in claim 7, wherein the communication module is operable to identify that the symbols in the data in the second transmission are permutated across sub-carrier frequencies with respect to the symbols in the first transmission by an indication in a header of the second transmission.

10. An apparatus as described in claim 7, wherein the communication module is operable to reconstruct the symbols by using the optimal weighted average.

11. An apparatus as described in claim 7, wherein the communication module is operable to reconstruct the symbols through use of maximum ratio combining (MRC).

12. A method comprising:
   transmitting data having a plurality of symbols with a single antenna utilizing a first sub-carrier frequency mapping such that each said symbol is transmitted using a respective said sub-carrier frequency; and
   retransmitting the data with the single antenna utilizing a second sub-carrier frequency mapping that is a permutation of the first sub-carrier frequency mapping such that the plurality of symbols in the retransmission use a different permutation of the plurality of sub-carrier frequencies than that used in the transmission, wherein the second sub-carrier mapping is selected from a plurality of sub-carrier frequency mappings pre-generated to account for an environment the single antenna is located in; and demodulating a combined packet that includes original and retransmitted symbols in the combined packet, to obtain an optimal weighted average of the symbols of packets of the combined packet.

13. A method as described in claim 12, wherein the plurality of symbols in the data in the retransmission use a different permutation of the plurality of sub-carrier frequencies such that a particular said sub carrier frequency used to transmit a particular said symbol in performance of the transmitting is not used to retransmit the particular said symbol.

14. A method as described in claim 12, wherein the retransmitting is performed when an acknowledgement has not been received from an intended recipient of the transmitted data for a predetermined amount of time.

15. A method comprising: Under control of one or more processors with executable instructions, transmitting data having a plurality of symbols with a single antenna utilizing a first sub-carrier frequency mapping such that each said symbol is transmitted using a respective said sub-carrier frequency; and retransmitting the data with the single antenna utilizing a second sub-carrier frequency mapping that is a permutation of the first sub-carrier frequency mapping such that the plurality of symbols in the retransmission use a different permutation of the plurality of sub-carrier frequencies than that used in the transmission, wherein the second sub-carrier mapping is selected from a plurality of sub-carrier frequency mappings pre-generated to account for an environment the single antenna is located in; and demodulating a combined packet that includes original and retransmitted symbols in the combined packet, to obtain an optimal weighted average of the symbols of packets of the combined packet.

\* \* \* \* \*